(12) United States Patent
Marsh et al.

(10) Patent No.: US 7,367,291 B2
(45) Date of Patent: May 6, 2008

(54) LOCOMOTIVE APPARATUS

(75) Inventors: Gregory Alan Marsh, Erie, PA (US); Ajith Kuttannair Kumar, Erie, PA (US)

(73) Assignee: General Electric Co., Schenectady, NY (US)

( * ) Notice: Subject to any disclaimer, the term of this patent is extended or adjusted under 35 U.S.C. 154(b) by 213 days.

(21) Appl. No.: 11/187,370

(22) Filed: Jul. 22, 2005

(65) Prior Publication Data

US 2006/0021588 A1    Feb. 2, 2006

Related U.S. Application Data

(60) Provisional application No. 60/590,556, filed on Jul. 23, 2004.

(51) Int. Cl.
*F01P 7/17* (2006.01)
*F02M 35/10* (2006.01)

(52) U.S. Cl. .............................. 123/41.08; 123/41.31; 123/184.21

(58) Field of Classification Search ................ 123/400, 123/41.04, 41.05, 41.08, 41.12, 41.14, 41.15, 123/41.31, 41.44, 41.56, 184.21; 137/59, 137/60, 61, 62
See application file for complete search history.

(56) References Cited

U.S. PATENT DOCUMENTS

| | | | | |
|---|---|---|---|---|
| 2,408,183 A * | 9/1946 | Wood | ...................... | 123/41.14 |
| 3,698,204 A * | 10/1972 | Schlotterbeck et al. | ........ | 62/206 |
| 4,231,384 A * | 11/1980 | Christensen | .................. | 137/62 |
| 4,367,699 A * | 1/1983 | Evans | ...................... | 123/41.23 |
| 4,601,264 A * | 7/1986 | Hirano | ..................... | 123/41.27 |
| 4,605,164 A * | 8/1986 | Hayashi et al. | ............. | 237/2 A |
| 4,616,602 A * | 10/1986 | Hirano et al. | ............. | 123/41.27 |
| 4,766,852 A * | 8/1988 | Hirano et al. | ............. | 123/41.21 |
| 4,782,795 A * | 11/1988 | Kubozuka et al. | ........ | 123/41.21 |
| 5,553,662 A * | 9/1996 | Longardner et al. | ........ | 165/202 |
| 5,582,138 A * | 12/1996 | Ziolek et al. | ............... | 123/41.1 |
| 6,142,108 A * | 11/2000 | Blichmann | ............... | 123/41.05 |
| 6,327,980 B1 * | 12/2001 | Chen et al. | ............... | 105/26.05 |
| 6,820,471 B2 * | 11/2004 | Ito | ............................. | 73/118.1 |
| 7,082,905 B2 * | 8/2006 | Fukuda et al. | ........... | 123/41.31 |
| 2005/0126517 A1 * | 6/2005 | Piccirilli et al. | ......... | 123/41.09 |
| 2005/0205682 A1 * | 9/2005 | Sanger et al. | ................. | 237/10 |

* cited by examiner

*Primary Examiner*—Stephen K. Cronin
*Assistant Examiner*—Katrina Harris
(74) *Attorney, Agent, or Firm*—Carlos Hanle; Steven M. McHugh

(57) ABSTRACT

In a railroad locomotive for operation in low ambient temperature conditions with the locomotive having an engine which includes a cooling system using a coolant liquid, a coolant liquid containment system is provided and includes a containment tank, an inlet port in fluid flow communication with an outlet from the engine cooling system and with the interior of the containment tank, an inlet valve for controlling the flow of coolant liquid through the inlet port, an outlet inlet port in fluid flow communication with the interior of the tank for discharge of the coolant liquid from the containment tank, an outlet valve for controlling the flow of coolant liquid from the containment tank, a sensor for monitoring a parameter indicative of the temperature of coolant liquid in the engine cooling system and generating a signal indicative of the temperature of the coolant liquid and a control device for receiving information indicative of the temperature of the coolant liquid and in communication with the inlet valve for controlling the operation of the inlet valve and the flow of the cooling liquid into the tank, when the temperature of the coolant liquid falls below a predetermined level.

14 Claims, 7 Drawing Sheets ial Patent
LOCOMOTIVE APPARATUS

RELATED APPLICATIONS

This application claims priority of U.S. Provisional Patent Application Ser. No. 60/590,556 filed Jul. 23, 2004, the contents of which are incorporated herein by reference in its entirety.

FIELD OF THE INVENTION

The present invention relates generally to locomotives and more particularly, to locomotives operating in an extreme environment.

BACKGROUND OF THE INVENTION

Locomotives operated at high altitudes and in the far north and south regions of the globe are typically subjected to extreme and severe environmental conditions which may have an adverse affect on the operation and performance of the locomotive, including cold temperatures, ice buildup and blowing and drifting snow. One disadvantage with operating locomotives in this type of environment involves blockage of the filters and/or ducts used to provide the required airflow to the locomotive. It is known that snow may be drawn into the air inlet ducts of a locomotive and may accumulate in sufficient quantities to obstruct the passage of air through these ducts. Thus, it is not uncommon for snow to accumulate on air filters disposed in the air inlet pathway of the locomotive. Such accumulations of snow may act to reduce the power output of the engine and/or may cause the engine to cease from operating completely.

One way to solve this problem involves increasing the temperature of the air flowing into the air inlet duct and passing through the final air filters by providing a flow of warm air that mixes with the cold ambient air flowing into the air inlet duct. In this case, if the temperature of the inlet air mixture can be maintained above the freezing point, any snow and/or ice that may develop or be deposited on the filters and/or ductwork will melt rather than accumulate and restrict the intake airflow. Unfortunately however, current methods and/or devices for providing the warm airflow require an operator to continuously monitor the filter air intake and to operate the device when warm air is needed to prevent buildup of snow and/or ice, thus taking the locomotive operator's attention away from operating the locomotive.

Another disadvantage involves the water used to cool the locomotive engine. A conventional cooling system used in a diesel locomotive typically includes coolant water without an anti-freeze additive. Although this type of system functions effectively in sub-freezing temperatures and while the locomotive's engine is running, the water must typically be dumped if the engine unexpectedly, unintentionally or accidentally shuts down. This is because without the engine operating, the engine will not be able to maintain the ambient temperature of the water to be above freezing. As such, the water contained within the system may freeze and damage the coolant system of the locomotive. However, in some situations, dumping of the water may cause severe damage to the railroad tracks and/or the surrounding structures.

For example, for locomotives that operate at higher altitudes, the ambient air temperature typically remains constant at sub-freezing temperatures. If the locomotive engine must stop or ceases to operate unexpectedly, dumping of the water may cause the permanently frozen subsoil or permafrost to melt. This is undesirable because in some locations (i.e. railway tracks disposed on mountainous terrain) this permafrost forms the major support structure for the railroad tracks. If this subsoil begins to melt, this may cause the terra firma surrounding the railroad tracks to become unstable and possibly unable to support the loads generated by the railroad tracks, thus subjecting every train that travels over that portion of track to possible derailment due to a shifting or total collapse of the track.

SUMMARY OF THE INVENTION

In a railroad locomotive for operation in low ambient temperature conditions with the locomotive having an engine which includes a cooling system using a coolant liquid, a coolant liquid containment system is provided and includes a containment tank, an inlet port in fluid flow communication with an outlet from the engine cooling system and with the interior of the containment tank, an inlet valve for controlling the flow of coolant liquid through the inlet port, an outlet inlet port in fluid flow communication with the interior of the tank for discharge of the coolant liquid from the containment tank, an outlet valve for controlling the flow of coolant liquid from the containment tank, a sensor for monitoring a parameter indicative of the temperature of coolant liquid in the engine cooling system and generating a signal indicative of the temperature of the coolant liquid and a control device for receiving information indicative of the temperature of the coolant liquid and in communication with the inlet valve for controlling the operation of the inlet valve and the flow of the cooling liquid into the tank, when the temperature of the coolant liquid falls below a predetermined level.

In a railroad locomotive for operation in cold temperature conditions having a locomotive engine disposed within an engine housing having an engine compartment opening in communication with an air inlet to the engine for flow of ambient air into the engine to be used as combustion air, an engine compartment door system is provided and includes a sensor for monitoring a parameter indicative of the resistance to flow of the ambient air through the air inlet due to snow and ice blockage and generating a signal indicative of the resistance to flow, a controller for the engine compartment door system for receiving information indicative of the resistance to flow through the air inlet and a device door at the opening to the engine housing movable between a closed position and an open position, with the controller controlling movement of the door to the open position when flow blockage is indicated and to the closed position when no flow blockage is indicated, with the device door being disposed to cover the engine housing when in the closed position to contain heat generated by the locomotive engine within the locomotive engine housing and with the device door enabling heat generated by the locomotive engine to communicate with the air inlet when in the open position to help remove snow and ice blockage in the air inlet.

BRIEF DESCRIPTION OF THE FIGURES

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

Figure 1:
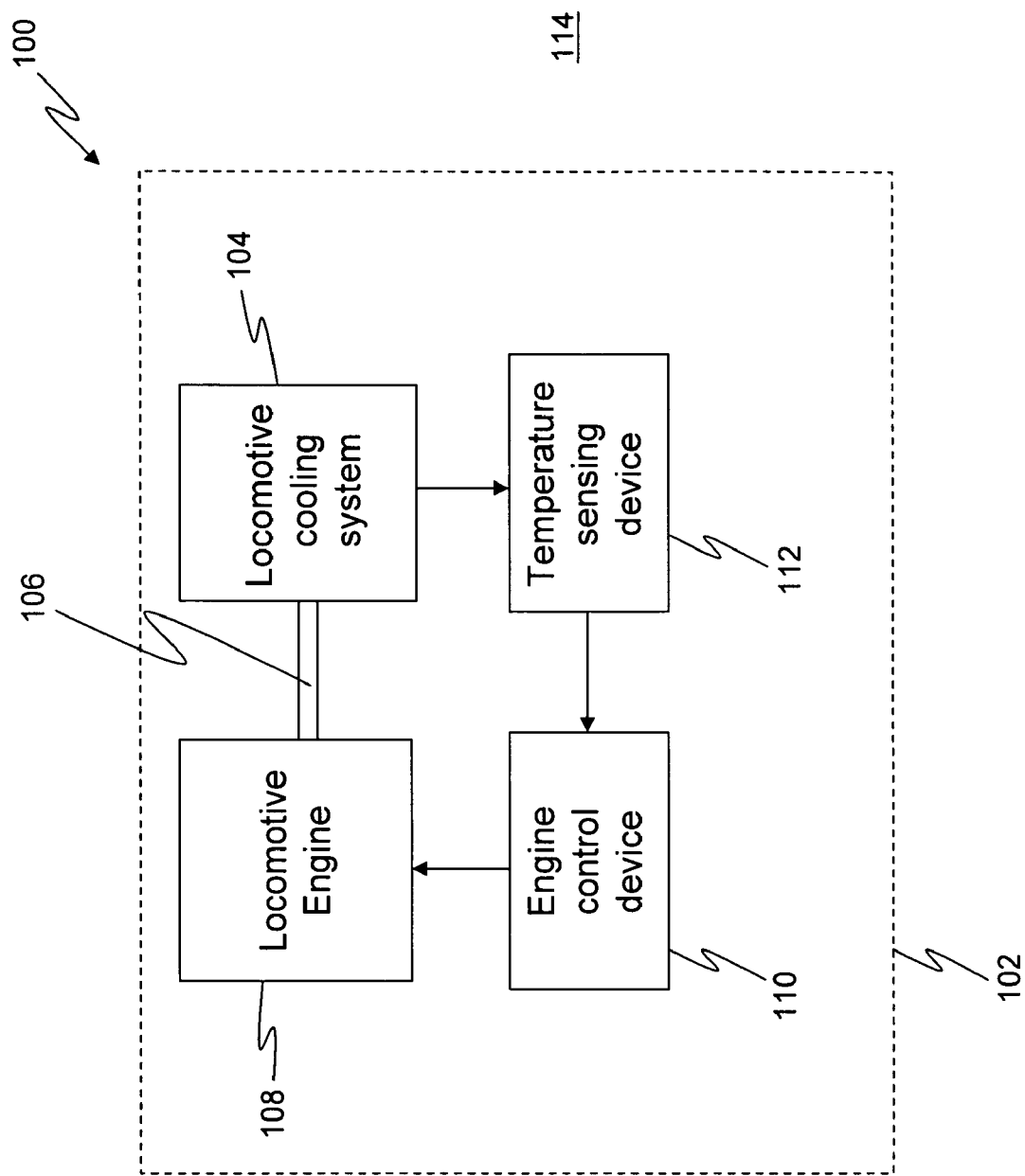
FIG. 1 is a block diagram illustrating an overall system design for an Automatic Engine Start/Stop (AES) device.

Referring to FIG. 1, a block diagram illustrating an overall system design for an Automatic Engine Start/Stop (AES) device 100 is shown and includes a locomotive 102 having a locomotive cooling system 104 including a cooling fluid 106, a locomotive engine 108, an engine control device 110 and a temperature sensing device 112. Engine control device 110 is communicated with locomotive engine 108 and temperature sensing device 1112, wherein temperature sensing device 112 is further communicated with locomotive cooling system 104 and an ambient environment 114. It should be appreciated that AES device 100 operates as follows. Temperature sensing device 112 senses the temperature of the ambient environment 114 and the fluid 106 contained within locomotive cooling system 104 and communicates these values to engine control device 110. If the locomotive engine 108 is shut down, the air temperature of ambient environment 114 is equal to or below a predetermined ambient threshold temperature, such as 0° C. (32° F.), and the temperature of the fluid 106 contained within locomotive cooling system 104 is equal to or below a predetermined minimum threshold temperature, then engine control device 110 starts up locomotive engine 108. When the temperature of the fluid 106 within locomotive cooling system 104 reaches a predetermined maximum threshold temperature, then engine control device 110 stops, or shuts down, locomotive engine 108. This cycle is repeated as necessary.

It should be appreciated that temperature sensing device 112 may continuously transmit temperature data to engine control device 110 or temperature sensing device 112 may periodically (according to a predetermined schedule or algorithm) transmit temperature data to engine control device 110. Moreover, it should be appreciated that communications between engine control device 110, temperature sensing device 112 and locomotive engine 108 may be achieved, in part or in whole, via wireless communications, hard wired communications or any combination thereof.

Figure 2:
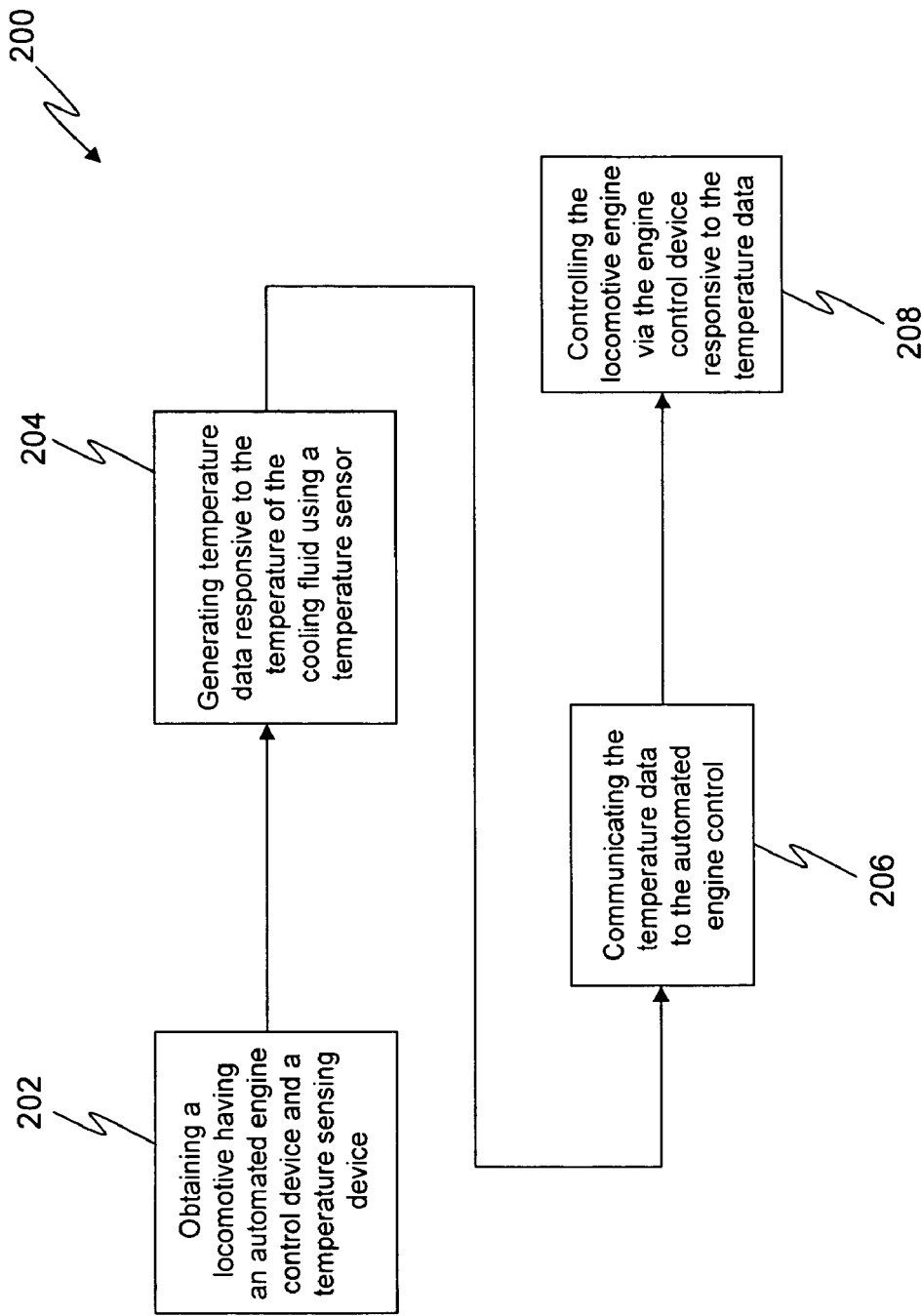
FIG. 2 is a block diagram illustrating a method for maintaining the temperature of a cooling fluid within a locomotive cooling system.

Referring to FIG. 2, a block diagram illustrating a method 200 for maintaining the temperature of the cooling fluid 106 within a locomotive cooling system 104 when the locomotive 102 is not being operated is shown and includes obtaining the locomotive 102 having an automated engine control device 110 and a temperature sensing device 112, as shown in block 202. The automated engine control device 110 is associated with the locomotive engine 102 and the temperature sensing device 112 is associated with the locomotive cooling system 104. Temperature data responsive to the temperature of the cooling fluid 160 is generated using temperature sensing device 112, as shown in block 204. It should be appreciated that temperature sensing device 112 may also be able to measure the temperature of the ambient air external to the locomotive 102 and include that ambient temperature into the temperature data. The temperature data is communicated with the automated engine control device 110, as shown in block 206, and the locomotive engine 102 is controlled via the automated engine control device 110 responsive to the temperature data. It should be appreciated that if the temperature data reaches a predetermined temperature threshold value the automated engine control device 110 causes the locomotive engine 102 to react in a predetermined manner, such as causes the engine to start up or shut down.

Figure 3A:
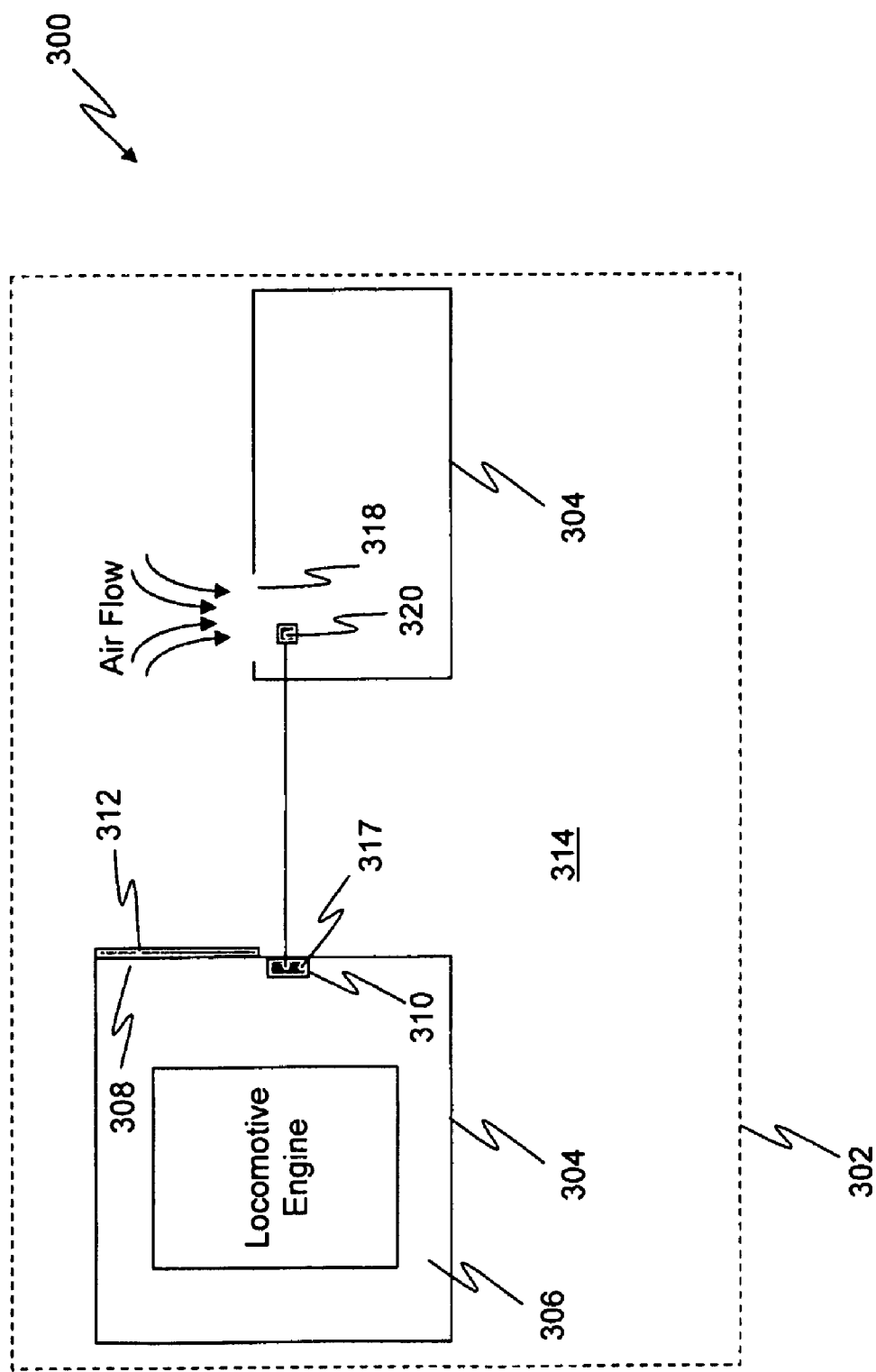
FIG. 3A is a block diagram illustrating an overall system design for an Automated Summer/Winter Door (ASWD) system with the device door in the engaged configuration.
Figure 3B:
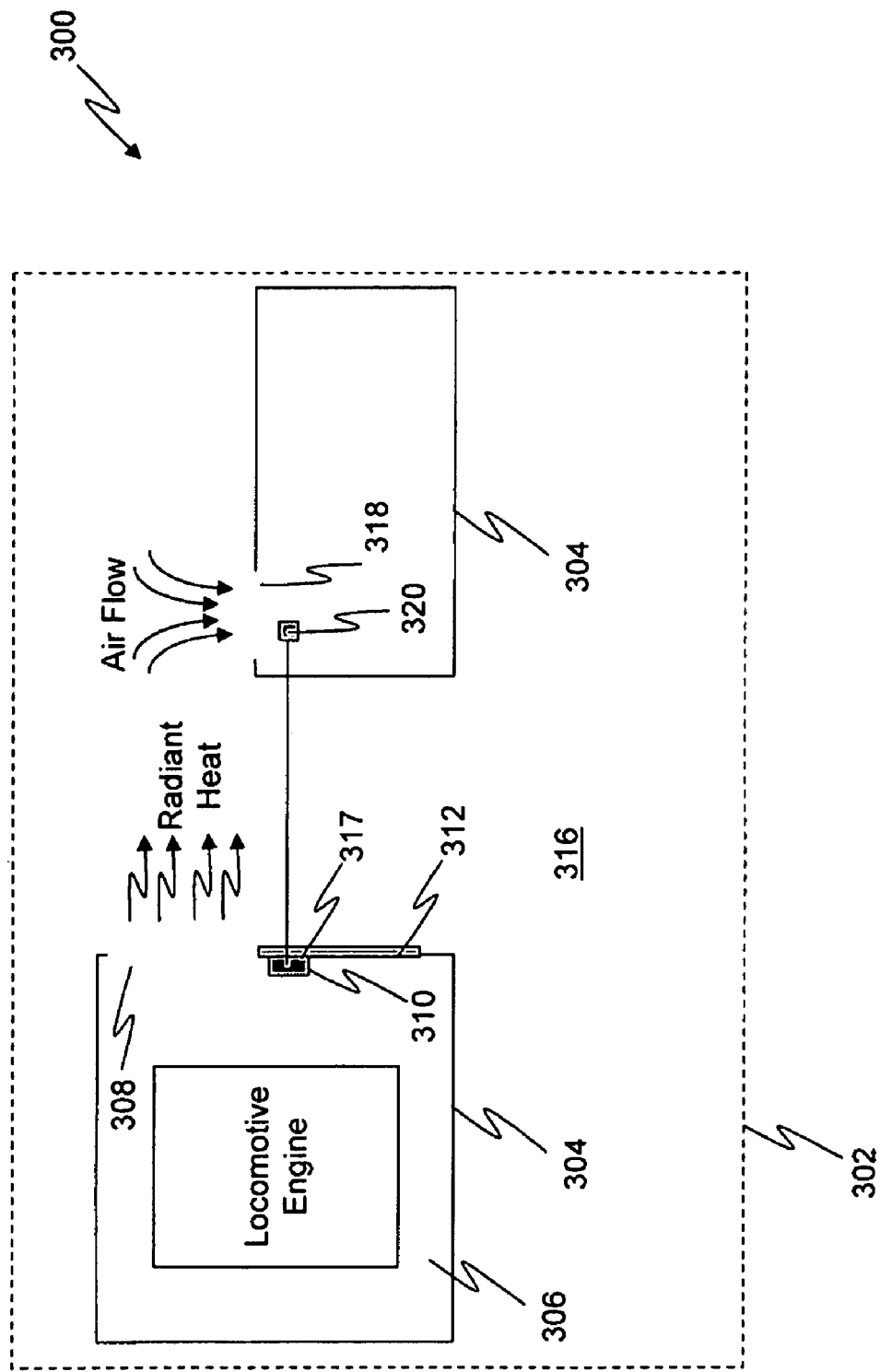
FIG. 3B is a block diagram illustrating an overall system design for an Automated Summer/Winter Door (ASWD) system with the device door in the disengaged configuration.

Referring to FIG. 3A and FIG. 3B, a block diagram illustrating an overall system design for an Automated Summer/Winter Door (ASWD) system 300 is shown and includes a locomotive 302 having a locomotive structure 304 defining a locomotive engine cavity 306 and a locomotive engine cavity outlet port 308. An ASWD device 310 is provided and includes a device door 312 configurable between an engaged configuration 314 and a disengaged configuration 316 via an ASWD door controller 317, wherein ASWD device 310 is disposed such that device door 312 is associated with locomotive cavity outlet port 308. When device door 312 is in the engaged configuration 314, device door 312 is disposed to cover locomotive cavity outlet port 308 enclosing locomotive cavity 306. Conversely, when device door 312 is in the disengaged configuration 316, device door 312 is disposed away from locomotive cavity outlet port 308 such that locomotive cavity 306 is at least partially accessible via locomotive cavity outlet port 308.

Locomotive structure 304 also defines an air inlet port 318 for receiving an air flow from the ambient environment, wherein the airflow provides cooling air to the locomotives systems. An airflow sensor 320 is also provided, wherein the airflow sensor 320 is disposed within the air inlet port 318 to measure the volume of air flowing into air inlet port 318. Furthermore, the airflow sensor 320 is communicated with ASWD system 300 such that airflow sensor 320 provides airflow data to ASWD system 300. It should be appreciated that airflow sensor 320 may be communicated with ASWD system 300 via any device and or method suitable to the desired end purpose, such as wireless communications, hardwired communications, via an additional control device or any combination thereof.

It should be appreciated that ASWD system 300 operates as follows. As the locomotive 302 is operating air is being drawn into air inlet port 318. As the air flow enters air inlet port 318, airflow sensor 320 monitors and measures the volume of air being entering air inlet port 318 and communicates this airflow data to ASWD door controller 317. If the volume of air flowing into air inlet port 318 is less than a predetermined minimum airflow volume threshold and the ambient air temperature is less than a predetermined ambient air temperature, then ASWD door controller 317 causes device door 312 to be configured into the dis-engaged configuration 316 allowing ambient and radiant heat from locomotive engine cavity 306 to flow into air inlet port 318 via locomotive engine cavity outlet port 308. As the volume of air flow increases, ASWD door controller 317 may or may not cause device door 312 to be reconfigured back into the engaged configuration 314.

It should be appreciated that airflow sensor 320 may continuously transmit airflow data to ASWD door controller 317 or airflow sensor 320 may periodically (according to a predetermined schedule or algorithm) transmit airflow data to ASWD door controller 317. Moreover, it should be appreciated that communications airflow sensor 320 and ASWD door controller 317 may be achieved, in part or in whole, via wireless communications, hard wired communications or any combination thereof.

Figure 4:
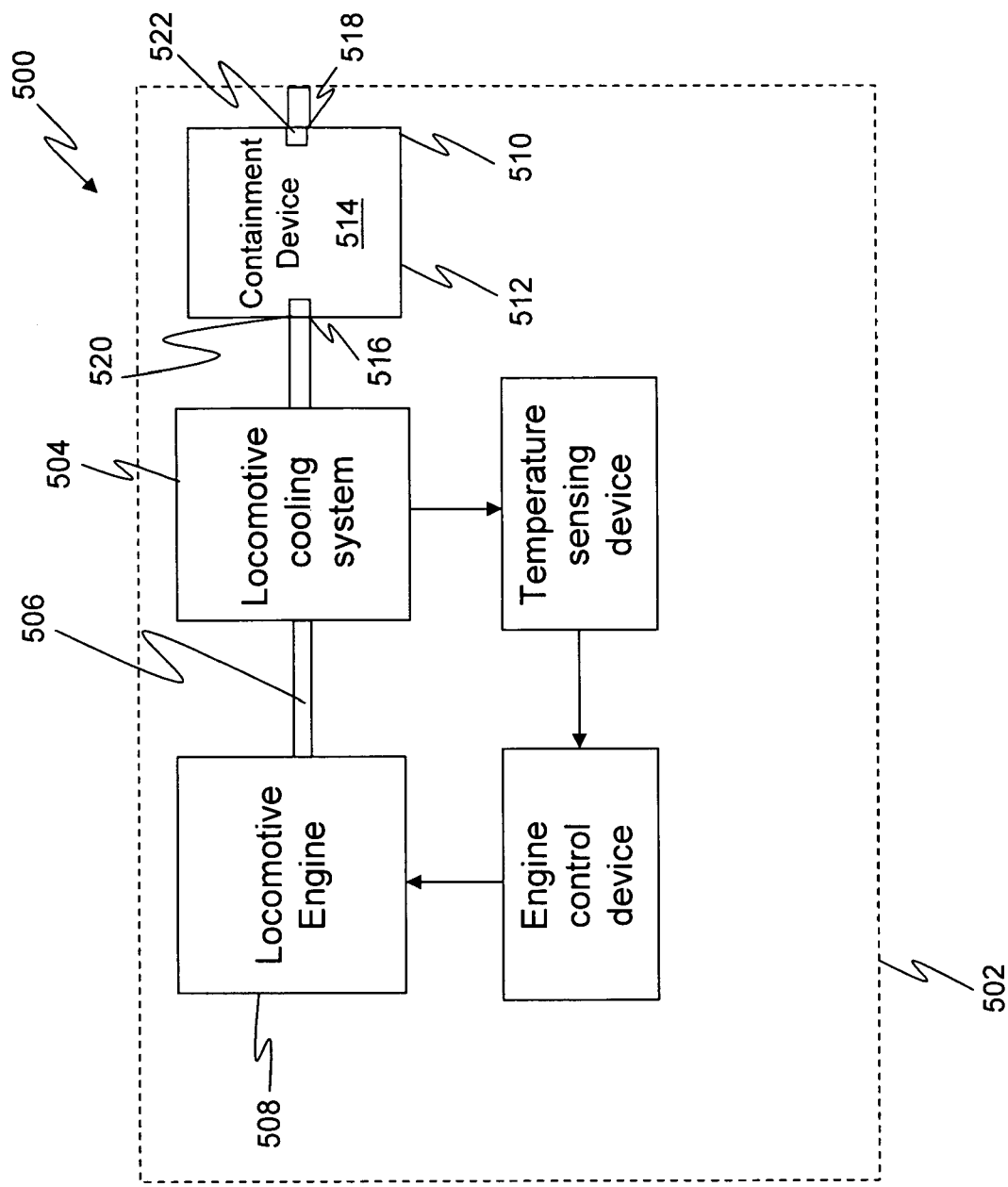
FIG. 4 is a block diagram illustrating a locomotive system design incorporating a water containment system.

Referring to FIG. 4, a block diagram illustrating a locomotive system design incorporating a water containment system 500 is shown and includes a locomotive 502 having a locomotive cooling system 504 including a cooling fluid 506, a locomotive engine 508 and a fluid containment device 510. Fluid containment device 510 includes a device structure 512 which defines a device cavity 514 for containing cooling fluid 506. Device structure 512 also defines a device inlet 516 and a device outlet 518, wherein device inlet 516 is communicated with locomotive cooling system 504 for receiving cooling fluid 506 and wherein device outlet 518 is communicated with the ambient environment external to locomotive 502. Fluid containment device 510 also includes a fluid inlet control valve 520 and a fluid outlet control valve 522 for controlling the flow of fluid into and out of device cavity 514, respectively.

Device structure 512 may be constructed from an elastic, size accommodating material such that if device cavity 514 is filled with cooling fluid 506 and cooling fluid 506 freezes and expands, device structure 512 will not rupture and/or leak. When the locomotive 502 reaches a location where dumping of coolant is allowed and/or will not cause damage, fluid outlet control valve 522 may be operated to discharge the cooling fluid 506 contained within device cavity 512. It should be appreciated that fluid outlet control valve 522 may be a mechanical, electrical and/or a pneumatic device and may be operated automatically, manually and/or remotely.

Figure 5:
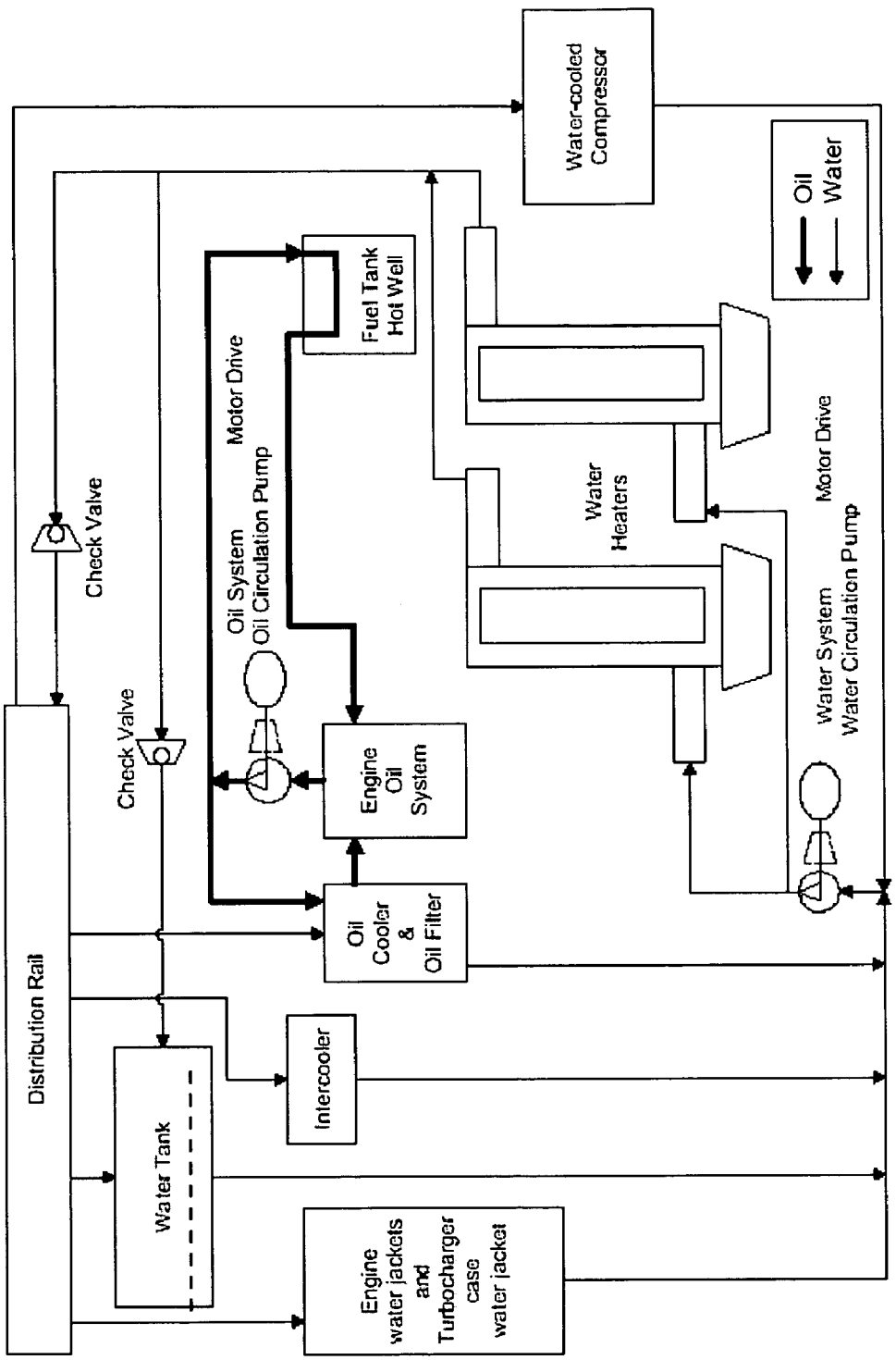
FIG. 5 is an overall schematic of a locomotive cooling system.
Figure 6:
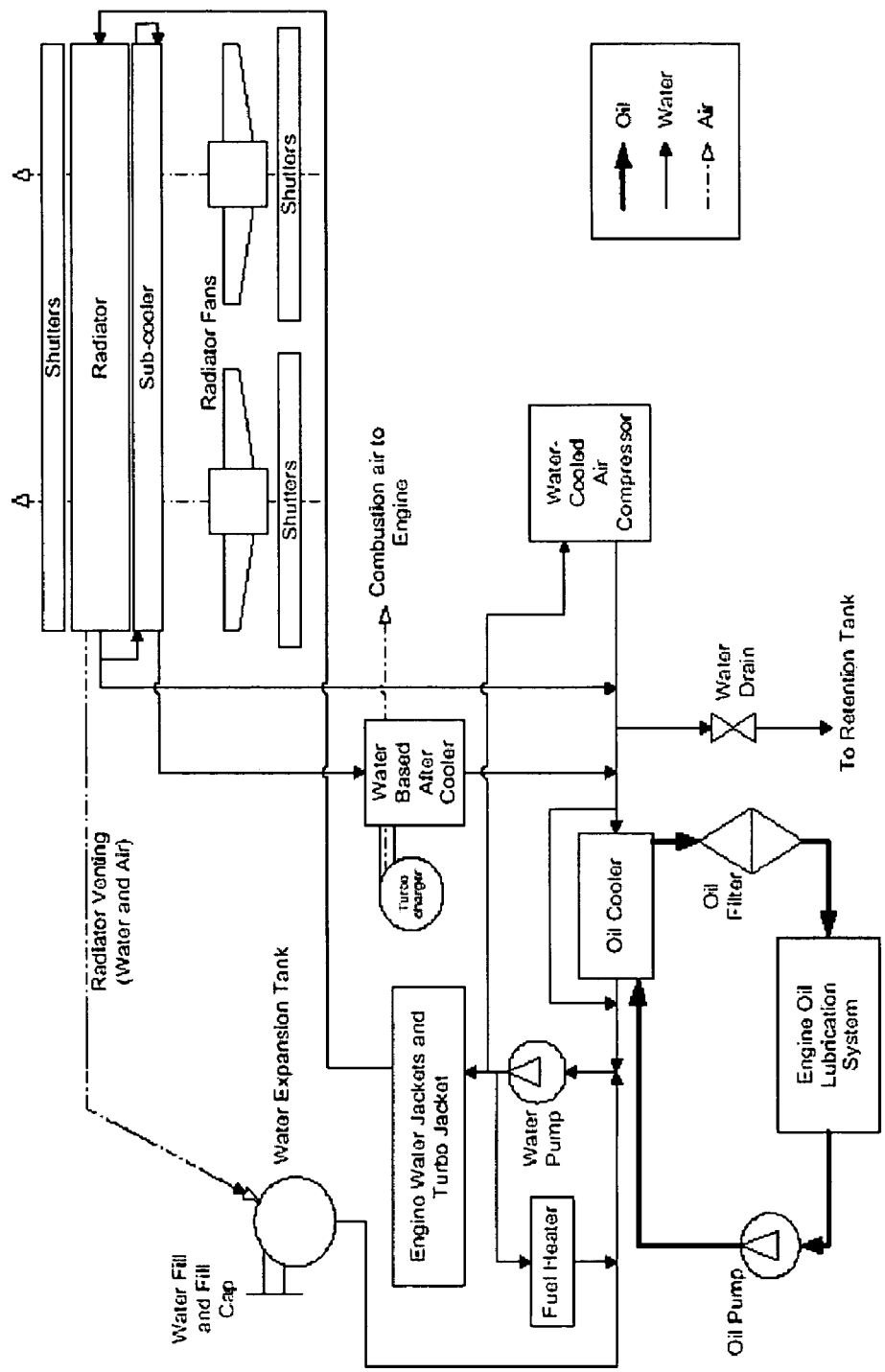
FIG. 6 is a schematic of a lay-up heater circuit.

Referring to FIG. 5 and FIG. 6, it should be appreciated that at least four (4) levels of protection will be provided by the locomotive equipment and the cooling system control logic disclosed herein. Any of the levels of protection can fail and water still not be dumped. These levels of protection include, but are not limited to, the inlet and outlet shutters on the radiator system closing when too much heat is going out and will work in conjunction with changes in engine speed. The automated doors may be used to keep other parts of the locomotive from loosing heat, as well, by allowing the ambient air inflow into these parts to be shut off. Additionally, temperature/rate of change of temperature to provide failure information.

Moreover, the inlet and outlet shutters may open or close as required to maintain engine water and oil temperature while the engine is idling. The shutters may be controlled by microprocessors responsive to the ambient conditions, water/oil temperature, engine operating conditions. Also, if the engine is idling, the engine speed may increase and decrease in order to maintain the engine water and oil temperatures by increasing the load on the engine. Furthermore, if the engine shuts down for any reason and the engine water and oil temperatures fall below a predetermined temperature value, the Lay-up heater system will start and maintain the engine and water temperatures. This may be accomplished by employing one or more redundant heaters (Lay-up heaters) that are 'stand-alone' heater systems and that may be used in conjunction with a controller that may control the heaters in an automatic fashion or allow for the manual control of the heaters. Also, a redundancy of heat sources may be used, such as wayside power, power from other locomotives, Auxiliary Power Unit (APU).

It should also be appreciated that the Lay-up heaters are protected in a circuit and drain venting for the circuit is provided by at least one reverse check valve and the physical location of the equipment regarding height and gravity draining. If the lay-up heating system fails or if it is unable to maintain engine water temperature above a predetermined temperature value, the AES device 100 will start the engine to provide heat and maintain the engine water and oil temperatures. The lay up heating could also be used to keep other equipment/fluids warm and/or prevent from freezing ex. Fuel, battery, control electronics, grid packaging, cab etc. The heating system could use diesel fired heaters.

However, if for some reason the engine can not be restarted, then a computer controlled automatic water dump system will dump the water when the temperature of the water reaches a predetermined temperature value. Thus, the water may be dumped into fluid containment device 510, before the water freezes. It should be appreciated that fluid containment device 510 may be any type of fluid containment device suitable to the desired end purpose, such as an expandable bladder and/or a tank protected from freeze damage by a freeze protection plug that will burst to relieve pressure from expanding ice. Moreover, fluid containment device 510 may be used to collect and/or contain other fluids as well as water, such as engine oil, or multiple fluid containment devices 510 may be used, as desired. Moreover, the liquids collected and/or contained with the fluid containment device 510 may be monitored to prevent overflow. Furthermore, it should be appreciated that APU generated power as well as its radiant and cooling water/oil and exhaust power could be used to provide heat for keeping the equipment warm or that wayside power may be used to provide heat for keeping the equipment warm or that trainline power may be used to provide heat to keep the equipment warm.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. In a railroad locomotive for operation in low ambient temperature conditions with the locomotive having an engine which includes a cooling system using a coolant liquid, a coolant liquid containment system, comprising:

a containment tank;

an inlet port in fluid flow communication with an outlet from the engine cooling system and with the interior of said containment tank;

an inlet valve for controlling the flow of coolant liquid through said inlet port;

an outlet inlet port in fluid flow communication with said interior of said tank for discharge of the coolant liquid from said containment tank and out of the locomotive;

an outlet valve for controlling the flow of coolant liquid from said containment tank and out of the locomotive, a sensor for monitoring a parameter indicative of the temperature of coolant liquid in the engine cooling system and generating a signal indicative of said temperature of the coolant liquid; and a control device for receiving information indicative of said temperature of the coolant liquid and in communication with said inlet valve for controlling the operation of said inlet valve and said flow of the cooling liquid into said tank, when said temperature of the coolant liquid falls below a predetermined level.

2. The coolant liquid containment system of claim 1, wherein said control device is further in communication with said outlet valve for the selective discharge of liquid held in said containment tank.

3. The coolant liquid containment system of claim 1, further including a processing device for operating said control device via at least one of a remote configuration, an automatic configuration and a control device disposed within a locomotive operator cab.

4. The coolant liquid containment system of claim 1, wherein said predetermined level is responsive to the freezing temperature of the coolant liquid.

5. The coolant liquid containment system of claim 4, wherein said freezing temperature is 32° Celsius.

6. The coolant liquid containment system of claim 1, wherein said containment tank is configured to expand and contract responsive to the coolant liquid contained therein.

7. In a railroad locomotive for operation in cold temperature conditions having a locomotive engine disposed within an engine housing having an engine compartment opening in communication with an air inlet to the engine for flow of ambient air into the engine to be used as combustion air, an engine compartment door system, comprising:

a sensor for monitoring a parameter indicative of the resistance to flow of the ambient air through the air inlet due to snow and ice blockage, and generating a signal indicative of said resistance to flow;

a controller for the engine compartment door system for receiving information indicative of said resistance to flow through the air inlet; and a device door at the opening to the engine housing movable between a closed position and an open position, with said controller controlling movement of the door to said open position when flow blockage is indicated and to said closed position when no flow blockage is indicated, with said device door being disposed to cover the engine housing when in said closed position to contain heat generated by the locomotive engine within the locomotive engine housing and with said device door enabling heat generated by the locomotive engine to communicate with the air inlet when in said open position to help remove snow and ice blockage in the air inlet.

8. The engine compartment door system of claim 7, wherein said signal is responsive to the volume of the ambient air flow through said air inlet.

9. The engine compartment door system of claim 8, wherein said sensor is further associated with said controller for automatically configuring said device door between said open position and said closed position responsive to said signal.

10. The engine compartment door system of claim 9, wherein said at least one sensing device is at least one of an airflow sensor and an air temperature sensor.

11. The engine compartment door system of claim 7, wherein said sensor is associated with said door controller device via at least one of an electrical connection and a wireless connection.

12. The engine compartment door system of claim 7, further including at least one flow direction device, wherein said at least one flow direction device is associated with the locomotive engine compartment to at least partially direct the flow of radiant heat generated by the locomotive engine to a predetermined location.

13. The engine compartment door system of claim 12, wherein said at least one flow direction device is at least one of a fan and an airflow duct.

14. The engine compartment door system of claim 12, wherein said predetermined location is the air inlet to the engine.

* * * * *